April 7, 1964     J. BACOKA     3,128,017
STORAGE COMPARTMENT DISPENSING MECHANISM
Filed Sept. 11, 1961     2 Sheets-Sheet 1

INVENTOR
JOSIP BACOKA
BY
ATTORNEYS

April 7, 1964  J. BACOKA  3,128,017
STORAGE COMPARTMENT DISPENSING MECHANISM
Filed Sept. 11, 1961  2 Sheets-Sheet 2
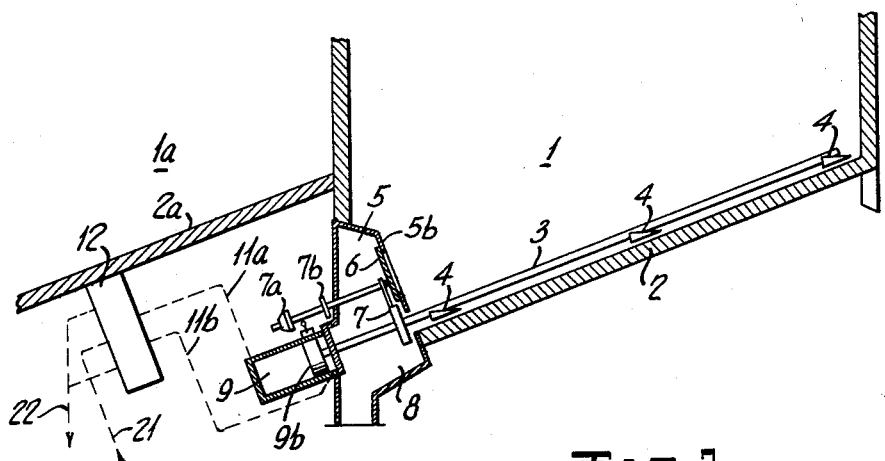
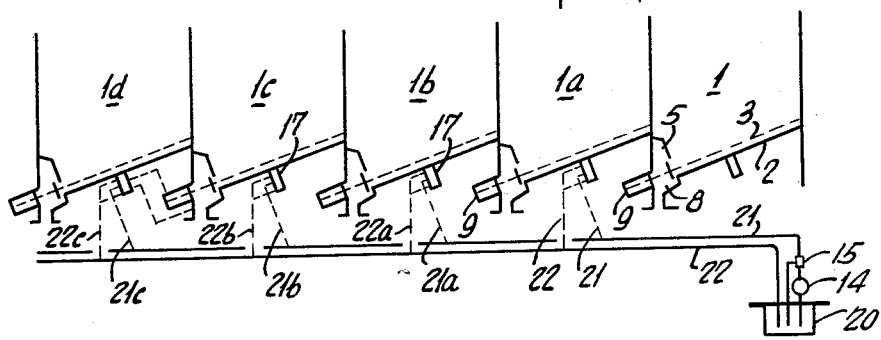
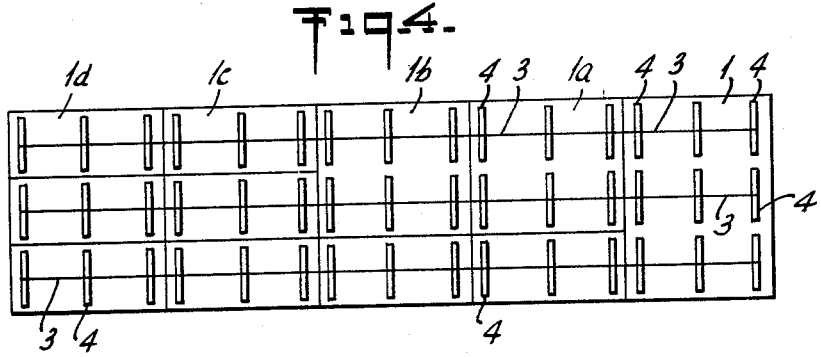
INVENTOR
JOSIP BACOKA
BY McGlew and Toren
ATTORNEYS

United States Patent Office 3,128,017
Patented Apr. 7, 1964

3,128,017
STORAGE COMPARTMENT DISPENSING MECHANISM
Josip Bacoka, St. Gallen, Switzerland, assignor to Gebrüder Bühler, Uzwil, Switzerland
Filed Sept. 11, 1961, Ser. No. 137,249
Claims priority, application Germany Sept. 13, 1960
9 Claims. (Cl. 222—243)

This invention relates in general to dispensing devices and in particular to a new and useful dispensing mechanism for emptying and discharging silos or individual compartments or cells of such silos of the product stored therein.

The invention has particular application to silos, storage bins, grain elevators and the like which are adapted to be filled with harvested products, such as grain, cornstalks, granular and husky materials and similar fibrous and vegetable matter. Great difficulty is encountered in emptying materials from storage compartments of this nature due to the uneven feeding of the materials out of the compartments which causes the formation of isolated pockets of materials and bridges of materials over areas which are emptied. In many instances, it is usual that large quantities of materials are discharged directly over a discharge opening, but that huge piles of the materials are located directly therearound which suddenly slide down or collapse.

In accordance with the present invention, there is provided a dispensing mechanism particularly adapted for use in association with silos and similar storage compartments arranged to provide for the even discharge feeding of materials out of the storage compartment. The dispensing mechanism includes a reciprocating member arranged to close a discharge opening in a silo and including a ledge or rake portion arranged to move backwardly and forwardly along a sloping or inclined wall forming the interior of the compartment. The reciprocating rake member includes a closure or cover which is adapted to be moved into position closing the discharge opening and to be moved away from the opening to permit discharge of goods during the reciprocation of the member. A feature of the construction is that the dispensing device forms a delivery chamber adjacent a discharge opening formed at the lower portion of the silo or storage compartment. Means are provided to automatically reciprocate the rake member which carries both the closure cover and the rake elements. The reciprocating movement produces agitation and even feeding of the discharge components of material through the discharge opening and into the discharge chamber where the evenly mixed materials are permitted to discharge outwardly for use.

In accordance with the invention, the level of the material column to be discharged will remain during discharge at a uniform height through the extent of the compartmented area in which the reciprocating member with the rake elements is arranged to operate. In addition, the discharge product is qualitatively mixed by the even discharge of material throughout the extent of the storage compartment.

A further feature of the construction is that the silo to be emptied is provided with a dispensing mechanism which includes a reciprocating member having a closure or lid and rigidly connected rake elements. The member is moved to and fro to periodically move the materials being discharged backwardly and forwardly in the discharge opening and to scrape the materials from the bottom wall to effect the even discharge thereof.

The inventive arrangement prevents, primarily, cloggings, blockage and cavity formations in the lower region of the compartment space (generally referred to as bridges). In addition, the arrangement enables the discharge in an orderly and controlled manner in adjacent compartments or compartments which are arranged one behind the other simultaneously and independently of the kind of material which is to be discharged.

Accordingly, it is an object of this invention to provide an improved discharging mechanism particularly adapted for use in association with a storage compartment such as a silo.

A further object of the invention is to provide a dispensing device for powdered, granular and husky or fibrous materials which includes a reciprocating member having means to simultaneously close and open a discharge exit and to rake the bottom portion of the material being discharged.

A further object of the invention is to provide a discharge mechanism which includes a reciprocating member adapted to be reciprocated in parallel arrangement to a sloping inclined bottom of a storage compartment, and which has a cover portion arranged in the exit opening of the compartment adapted to intermittently open and close the exit, and further includes rake elements which are adapted to move the layer of the material adjacent the inclined surface of the storage compartment.

A further object of the invention is to provide, in combination with a storage compartment for produce and similar materials having an inclined bottom leading to a discharge exit, a reciprocating element having rake portions which sweep the area immediately above the inclined surface of the compartment and including a closure cover which is adapted to move intermittently toward and away from the discharge opening, and means to control the reciprocation of the cover and the rake element in order to ensure even discharge of materials therefrom.

A further object of the invention is to provide a hydraulic control mechanism for operating one or more reciprocating elements for emptying a corresponding number of compartments of a storage system which includes means to reciprocate the elements backwardly and forwardly when discharge of the materials from the storage system is to be effected.

A further object of this invention is to provide a dispensing device for use in association with storage compartments which is rugged in construction, simple in design and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 2 is a view similar to FIG. 1 on a reduced scale but indicating the orientation of the device in association with several compartments of a grain storage system;

FIG. 3 is a diagrammatic indication of the use of the discharging mechanism in association with a plurality of bins of a grain storage silo system; and FIG. 4 is a diagrammatic plan view indicating five adjacent silo compartments having a common drive of a dispensing mechanism constructed in accordance with the invention.

Figure 1:
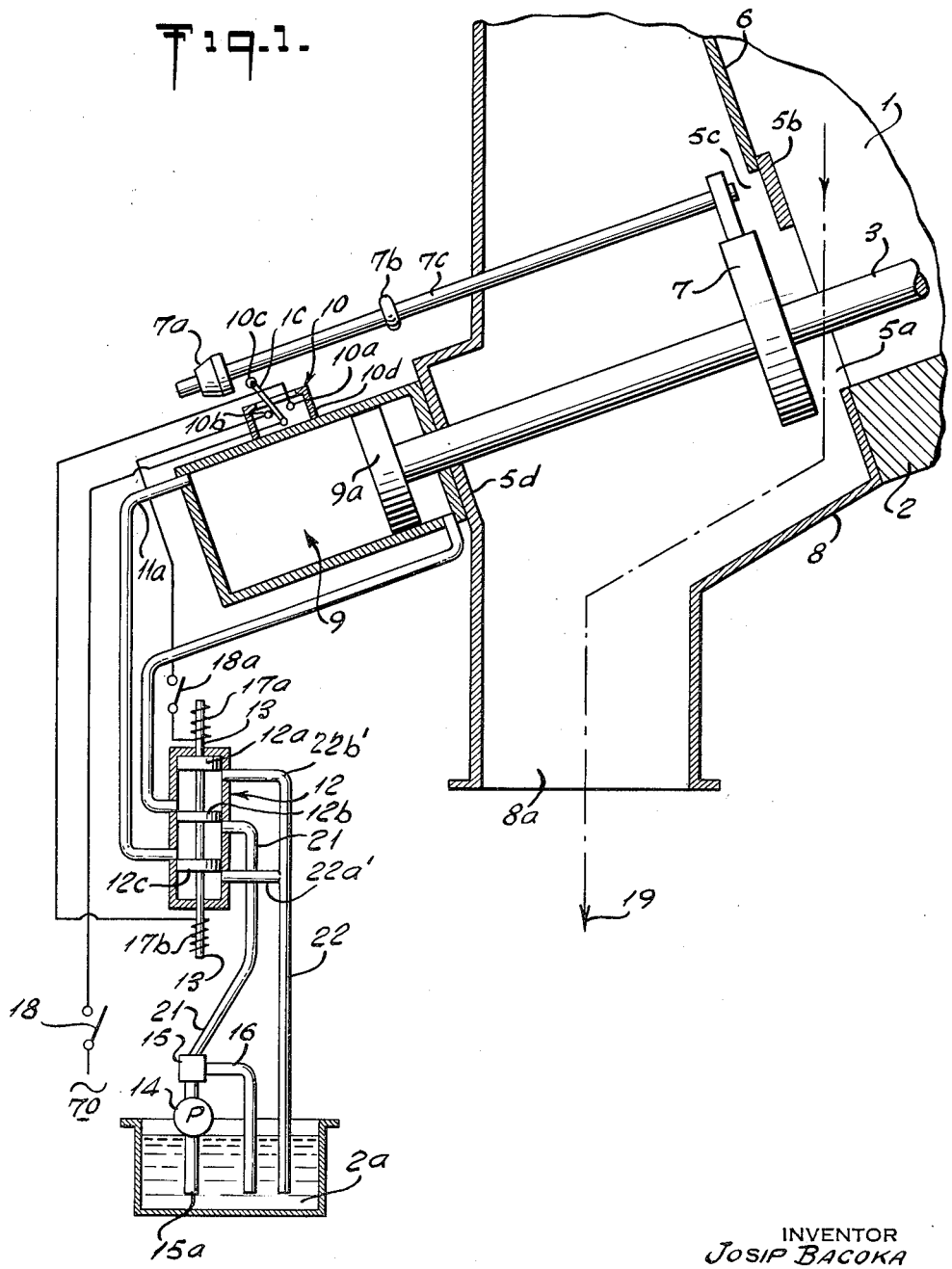
FIG. 1 is a somewhat schematic transverse sectional view of a silo having a dispensing mechanism and hydraulic control therefor constructed in accordance with the invention.

Referring to the drawings in particular, the invention embodied therein in FIG. 1 includes a silo 1 having an inclined bottom wall 2 with a discharge opening 5a which is formed at one corner of the silo and which leads to a discharge chamber formed by a surrounding housing generally designated 5. The housing 5 is constructed to fit against and close the lower corner of the silo 1.

The discharge housing 5 advantageously includes a slidable closure member or board 6 which may be slid in relationship to an inclined wall portion 5b to close or open an access opening 5c. The access opening 5c is made available for entry into the silo if the same should be necessary for loading and unloading or cleaning purposes. The discharge housing 5 also includes an inclined wall 8 disposed at a slightly downwardly increased angle from wall 2 of the silo which is adapted to receive materials discharged through the opening 5a for exit through a bottom opening 8a as indicated by the arrow 19.

In accordance with the invention, secured to an inclined wall 5d of the housing, which wall is substantially perpendicular to the inclined wall 2 of the silo, is an operating cylinder generally designated 9 in which is reciprocatable a piston 9a which is formed at the end of a reciprocating rod element 3. The reciprocating rod element 3 carries a plurality of spaced wedge shaped rake members or ledges 4 which are arranged at spaced locations along the length thereof to provide for the scraping of the inclined wall 2 of the silo and the movement of the material thereover to effect the even discharge thereof.

In accordance with the invention, the reciprocating rod member 3 carries a closure lid or cover 7 which reciprocates therewith to intermittently close and open the discharge opening 5a. The ledges 4 and the closure lid 7 reciprocate with the rod to ensure the even discharge of materials through the opening 5a. The ledges 4 are arranged so that they permit passage of the product without the formation of bridges above the discharge opening area or at isolated locations throughout the extent of the compartment length and width. In the event that the rod element 3 is not made coextensive with the width of the silo, any bridge formations which may occur at areas remote from the rod element 3 may be knocked down by access through the opening 5c by removing the control flap or inlet opening 6.

In order to effect the controlled reciprocation of the rod element 3, control means are provided which includes a rod element 7c which is connected at one end to an extension of the closure lid 7 and penetrates the housing 5. The rod 7c carries two axially spaced control cams 7a and 7b which advantageously may be adjustably positioned along its length for control timing purposes. The adjustment of the spacing between the cam elements is dependent upon the nature and character of the goods to be discharged. As indicated in FIG. 1, the control cam 7a is of frusto-conical configuration at its forward or free end.

A terminal or control switch 10 is mounted over the cylinder 9 and carries spaced contact elements 10a and 10b which are alternately electrically connected by means of a central movable contact rod member 1C having a ball-shaped end portion 10c which is contacted by one of the cam elements 7a and 7b when they are moved past by reciprocation of rod 3. The switch 10 may advantageously by moved backwardly and forwardly along the inclined surface of the cylinder 9 for adjustment purposes.

Cylinder 9 is pressurized on one side or the other of the piston 9a by means of lines or conduits 11a and 11b in accordance with the setting of a control valve generally designated 12. The control valve 12 is pressurized by means of an electric pump 14 which takes suction through a line 15a of a reservoir 20 and discharges through a line 21 into the control valve 12. A pressure relief valve 15 is provided permitting discharge of excess liquid through an overflow line 16 back into the reservoir 20. Depending on the setting of a control spindle or rod member 13, pressurized fluid is directed either into the line 11a or 11b. The control spindle 13 has end portions which are magnetically attractable by solenoid coils 17a and 17b, respectively, which are energized from a power source 70 in accordance with the disposition of the movable contact member 10c of the switch 10. When the coils 17a are energized (one end of the coil, not shown, being grounded), it pulls the control spindle 13 in the direction of the coils to reorient the location of piston portions 12a, 12b and 12c. As indicated in FIG. 1, pressurized fluid flows through the conduit 21 into the control valve 12 and out through conduit 11a to pressurize this end of the cylinder. Displaced fluid from the cylinder 9 flows through the discharge to the line 11b into the control valve 12 and is discharged therefrom out through discharge line 22b' into the reservoir 20.

When the reversing valve 12 is actuated in an opposite sense, such as by movement of the contact element 10c to the opposite contact 10b, then the solenoid 17b becomes actuated to pull the control spindle 13 in a direction toward it and to displace the piston portions 12a, 12b and 12c downwardly. Thereupon, the pressurized fluid will be directed into the line 11b to cause movement of the piston 9a to the left as indicated in FIG. 1. The discharge fluid will exit through the line 11a to the control valve 12 and thence out line 22a' to the discharge line 22 for discharge into the reservoir 20.

The current supply for controlling purposes is effectuated by a switch 18 while current disconnection is accomplished by the switch 18a. Wire leads extend from the switch 18 to the contact switch terminal 10b, whereas the switch 18a is connected at one end to the contact terminal 10a and to the solenoid 17a.

In the preferred arrangement indicated in FIG. 1, the entire discharge mechanism including the housing 5 and the associated cylinder 9 and control mechanism for operating the same are constructed as a unit which may be attached to the storage container such as the silo 1.

The operation of the device is as follows:

The compartment or silo is filled with a product to be discharged. The rod 3 with its cover 7 as indicated in FIG. 1 is disposed near an end position in which the upper opening 5a is substantially closed. The valve 12 is still in a position which permits free passage of the oil to the oil line 11a and to the hydraulic cylinder 9 while oil which is still obtained in the cylinder 9 runs back through the line 11b into the valve 12 and from there into the pipes 22a' and 22 into the container 20. In the meantime, the piston 9a has reached its end position and the lid 7 closes off the access opening 5a. The electric switch 18a is opened manually and the power to the electric pump 14 is manually disconnected by a switch (not shown).

Prior to discharge proper, the following takes place:

The switch 18 is switched in, and the pump 14 is started by throwing another switch. Oil is sucked through the pipe 14a from the reservoir 20 and through the valve 15, and is passed into the valve 12 via line 21. From there, the oil is delivered through the line 11a into the cylinder 9. The lid 7 is therefore moved further toward a closing position to press the materials in the vicinity of the opening 5a back into the silo 1. Switch 18 remains switched in and the cam 7a passes the switch lever 10c to move it off the contact 10a and to move it into the contact 10b.

For discharge purposes, switch 18a is switched in. The winding 17b is therefore energized to attract the control spindle 13 to move it downwardly and to cause oil to be pumped under pressure through line 11b and return through line 11a. This causes movement of the piston 9a to the left. The closure lid 7a moves in a direction away from the opening 5a so that the material in the compartment flows out in a direction of the arrow 19 through the lower exit opening 8a.

The above operation is continued until the control cam 7d moves to contact the movable contact arm 10c to throw the arm so that it makes contact with the terminal portion 10a to cause a further reversing of the control valve 12. Thus, the terminal switch is alternately reversed by the cams 7a and 7b due to the to and fro movement of the rod 7c along with the closure lid 7. Dependent on the nature of the product to be discharged, the stroke position and the stroke length of the rod 3 and the rakes 4 connected thereto are adjusted by displacing cams 7a and 7b on the rod 7c or by adjusting the position of the switch 10 along the cylinder 9.

In some instances it is also desirable to adjust the speed of the operation of the device and this is accomplished by including a variable speed pump such as 14, having a similar control mechanism for operating its output. When switch 18a is disconnected, the closure lid 7 is held in a position which causes the closure of the upper exit 5a so that no loosening of the connection can take place.

As indicated in FIG. 2 where to compartments 1a and 1b are located side by side in a storage system, the control cylinder 12 is mounted on an inclined wall 2a of the compartment 1a. By such an arrangement, several silo cells may be serviced from the same oil tank 20 and the same hydraulic pump 14 with the same overflow valve 15 employed.

In such a construction as indicated in FIG. 3, an oil line 21 which branches off from the overflow valve 15 is provided with branch lines 21a, 21b, etc., return lines 22, 22a, 22b and 22c being provided, the control being effected in the same manner through a control cylinder 17.

In FIG. 4, the silo compartments are shown in an arrangement side by side instead of one behind the other as shown in the other embodiment.

While a specific embodiment of the invention has been shown and described in detail to illustrate the application of the inventive principles, it will be understood that the invention may be embodied otherwise without departing from such principles.

What is claimed is:

1. A storage container having a bottom wall sloping to a discharge opening, a discharge device disposed in said opening and including an elongated rod member extending through said opening along said inclined bottom wall, a rake element on said elongated member adapted to move backwardly and forwardly with said elongated member to move materials disposed above said wall, a closure lid secured to said member adapted to move between positions closing and opening said discharge opening, a cylinder mounted adjacent said elongated member, a piston slidable in said cylinder connected to said elongated member, and fluid control means for cyclically pressurizing said cylinder on alternate sides of said piston to effect reciprocation of said elongated member and movement of said closure lid toward and away from said discharge opening.

2. A storage container according to claim 1, wherein said fluid control means includes a contact element mounted adjacent said closure member, means connected to said closure member adapted to move in the vicinity of said contact element, said contact element having a movable contact engageable by said movable member upon movement thereof in each direction by a predetermined amount, and control valve means connected to said contact member and operable by movement of said movable contact to reverse the direction of movement of said piston.

3. A storage container according to claim 1, including a plurality of individual compartmented areas each having an inclined wall, said control valve means of one of said compartmented portions being mounted on the inclined wall of the next adjacent portion.

4. A storage container according to claim 1, including a housing formed around the discharge opening of the storage container forming a discharge chamber.

5. A storage container according to claim 4, wherein said elongated rod member reciprocates through an opening in said housing.

6. A storage container having a bottom wall sloping to a discharge opening, a discharge device disposed in said opening and including an elongated rod member extending through said opening along said inclined bottom wall, a rake element on said elongated member adapted to move backwardly and forwardly with said elongated member to move materials disposed above said wall, a closure lid secured to said elongated member adapted to move between positions closing and opening said discharge opening, and means adjacent said elongated member and connected thereto to effect reciprocation of said elongated member and movement of said closure member toward and away from said discharge opening.

7. A storage container according to claim 6, wherein said means to reciprocate said elongated element includes a relatively movable piston and cylinder, and means to pressurize said cylinder intermittently on alternate sides of said piston.

8. A storage container according to claim 6, wherein said means to pressurize said cylinder intermittently on alternate sides of said piston includes a reversing valve and electric contact means to reverse the operation of said valve, said contact means including a movable contact element, said closure lid having means movable in a path intercepting said movable contact element to actuate said reversing valve.

9. A storage container having a bottom wall sloping to a discharge opening, a discharge device disposed in said opening and including an elongated rod member extending through said opening along said inclined bottom wall, a rake element on said elongated member adapted to move backwardly and forwardly with said elongated member to move materials disposed above said wall, a closure lid secured to said elongated member and adapted to move therewith between positions closing and opening said discharge opening, said closure lid being positioned to be in alignment with the discharge opening and movable in a plane substantially parallel to the bottom wall thereof and completely blocking the flow of material from said storage container when said lid closes the discharge opening and acting to brake the flow of material out of said container when said closure lid is moved toward said opening, and means mounted adjacent said elongated member and connected thereto to effect reciprocation of said elongated member and movement of said closure lid toward and away from said discharge opening.

References Cited in the file of this patent
UNITED STATES PATENTS

| 1,337,789 | Nicholas | Apr. 20, 1920 |
| 1,509,349 | France | Sept. 23, 1924 |
| 2,388,805 | Stahl | Nov. 13, 1945 |
| 2,529,777 | McInnis | Nov. 14, 1950 |
| 2,640,629 | Thompson et al. | June 2, 1953 |
| 2,684,801 | Goldberg | July 27, 1954 |
| 2,689,069 | Sparrow et al. | Sept. 14, 1954 |